(12) United States Patent
Hong

(10) Patent No.: US 6,559,624 B1
(45) Date of Patent: May 6, 2003

(54) VOLTAGE CONVERTER CAPABLE OF OUTPUTTING A STABLE OUTPUT VOLTAGE

(75) Inventor: Ching-Kuan Hong, Nan-Tou (TW)

(73) Assignee: Universal Scientific Industrial Co., Ltd., Nan-Tou Hsien (TW)

( * ) Notice: Subject to any disclaimer, the term of this patent is extended or adjusted under 35 U.S.C. 154(b) by 0 days.

(21) Appl. No.: 10/200,106

(22) Filed: Jul. 19, 2002

(51) Int. Cl.[7] ................................................ G05F 1/40
(52) U.S. Cl. ...................................... 323/280; 323/281
(58) Field of Search ................................. 323/280, 281, 323/273, 274

(56) References Cited

U.S. PATENT DOCUMENTS 4,618,814 A * 10/1986 Kato et al. .................. 323/280
6,075,351 A * 6/2000 Benes ......................... 323/280

* cited by examiner

*Primary Examiner*—Shawn Riley
(74) *Attorney, Agent, or Firm*—Ladas & Parry

(57) ABSTRACT

In a voltage converter, a voltage-controlled switching device of a power stage receives a control signal and operates accordingly at a switch-ON mode, where the control signal is a high-level signal, and a switch-OFF mode, where the control signal is a low-level signal. A comparator compares a trigger signal and an input signal associated with an output signal outputted by the power stage, and outputs the control signal, wherein the control signal is the high-level signal when the trigger signal is greater than the input signal, and wherein the control signal is the low-level signal when the trigger signal is less than the input signal. A trigger circuit receives a reference voltage and the control signal, and supplies the trigger signal to enable the comparator to output a periodic pulse signal that serves as the control signal such that the voltage-controlled switch device is activated periodically.

7 Claims, 2 Drawing Sheets

VOLTAGE CONVERTER CAPABLE OF OUTPUTTING A STABLE OUTPUT VOLTAGE

BACKGROUND OF THE INVENTION

1. Field of the Invention

The invention relates to a voltage converter, more particularly to a voltage converter capable of outputting a stable output voltage.

2. Description of the Related Art

A conventional voltage converter is generally provided with a control device for adjusting an output voltage thereof. The control device is usually in the form of a pulse-width modulation (PWM) controller. However, the PWM controller generally includes a differential amplifier, a sawtooth generator, a Schmidt comparator, an AND gate and a level shifter/FET driver, thereby resulting in a relatively complex design and higher costs.

SUMMARY OF THE INVENTION

Therefore, the object of the present invention is to provide a voltage converter capable of outputting an output signal with a stable output voltage, the voltage converter having a relatively simple construction and being capable of being produced at a relatively low cost.

According to one aspect of the present invention, a voltage converter comprises:

a power stage having an input adapted to be connected to a power source, and an output for outputting an output signal to a load, the power stage including a voltage-controlled switching device connected between the input and the output, the voltage-controlled switching device having a control input for receiving a control signal, the voltage-controlled switching device being operable at a switch-ON mode, where the control signal is a high-level signal, and a switch-OFF mode, where the control signal is a low-level signal;

a comparator having a first input end for receiving a trigger signal, a second input end for receiving an input signal associated with the output voltage, and an output end connected to the control input of the voltage-controlled switching device, the comparator comparing the trigger signal received at the first input end and the input signal received at the second input end, and outputting the control signal at the output end in accordance with result of comparison, wherein the control signal is the high-level signal when the trigger signal is greater than the input signal, and wherein the control signal is the low-level signal when the trigger signal is less than the input signal; and a trigger circuit having a first input port adapted to be connected to a reference voltage source for receiving a reference voltage, a second input port connected to the output end of the comparator for receiving the control signal, and an output port connected to the first input end of the comparator so as to supply the trigger signal to the comparator, the trigger circuit being operable such that the control signal becomes the high-level signal when the trigger signal reaches a first threshold voltage, and such that the control signal becomes the low-level signal when the trigger signal reaches a second threshold voltage greater than the first threshold voltage.

The trigger circuit enables the comparator to output a periodic pulse signal that serves as the control signal to enable the voltage-controlled switching device to be activated periodically such that the voltage converter generates the output signal with a stable output voltage.

According to another aspect of the present invention, there is provided a control device for generating a control signal in a voltage converter. The voltage converter includes a power stage that has an input connected to a power source, and an output for outputting an output signal to a load. The power stage includes a voltage-controlled switching device connected between the input and the output. The voltage-controlled switching device has a control input for receiving the control signal. The voltage-controlled switching device is operable at a switch-ON mode, where the control signal is a high-level signal, and a switch-OFF mode, where the control signal is a low-level signal. The control device comprises:

a comparator having a first input end for receiving a trigger signal, a second input end for receiving an input signal associated with the output signal, and an output end adapted to be connected to the control input of the voltage-controlled switching device, the comparator comparing the trigger signal received at the first input end and the input signal received at the second input end, and outputting the control signal at the output end in accordance with result of comparison, wherein the control signal is the high-level signal when the trigger signal is greater than the input signal, and wherein the control signal is the low-level signal when the trigger signal is less than the input signal; and a trigger circuit having a first input port adapted to be connected to a reference voltage source for receiving a reference voltage, a second input port connected to the output end of the comparator for receiving the control signal, and an output port connected to the first input end of the comparator so as to supply the trigger signal to the comparator, the trigger circuit being operable such that the control signal becomes the high-level signal when the trigger signal reaches a first threshold voltage, and such that the control signal becomes the low-level signal when the trigger signal reaches a second threshold voltage greater than the first threshold voltage.

The trigger circuit enables the comparator to output a periodic pulse signal that serves as the control signal to enable the voltage-controlled switching device to be activated periodically such that the voltage converter generates the output signal with a stable output voltage.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
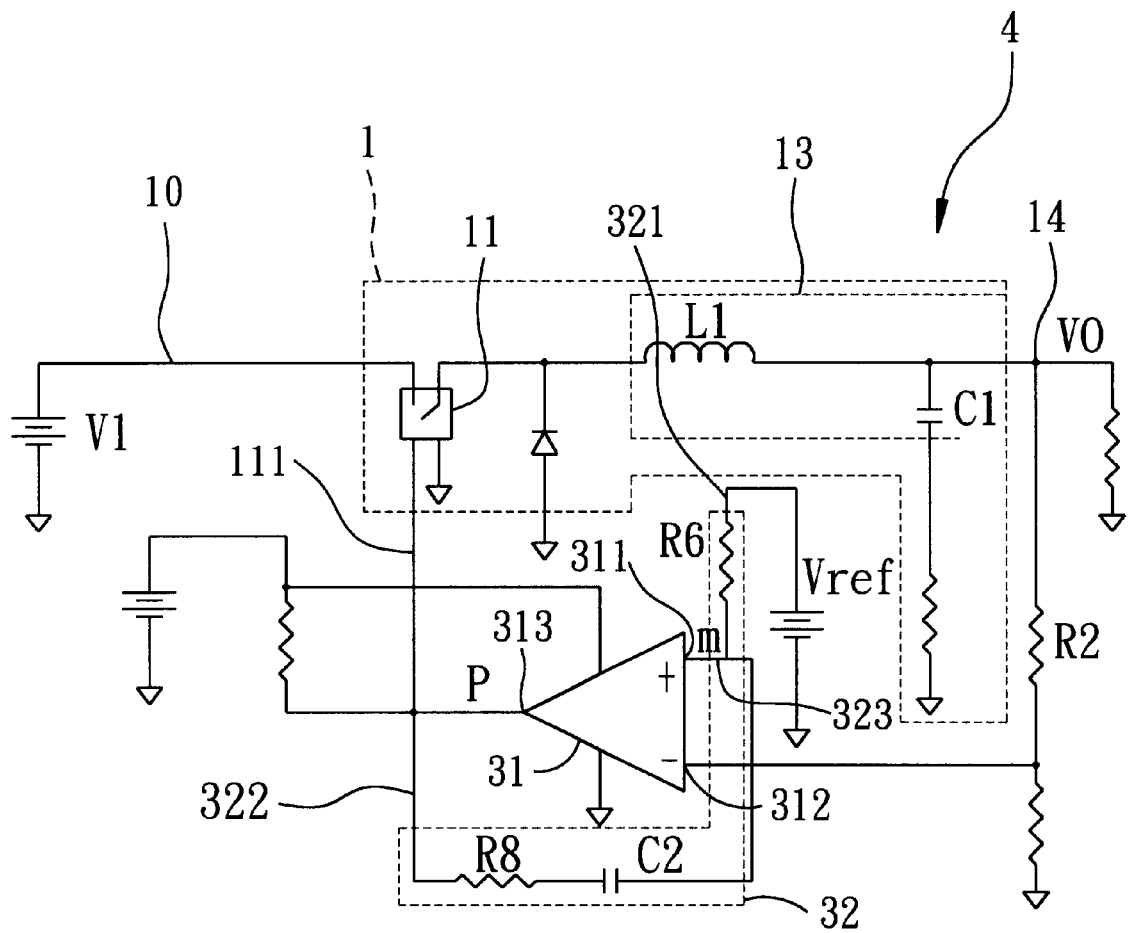
FIG. 1 is a schematic electrical circuit diagram illustrating the preferred embodiment of a voltage converter according to the present invention.

Referring to FIG. 1, the preferred embodiment of a voltage converter 4, such as a direct current-to-direct current voltage converter, according to the present invention is shown to include a power stage 1, a comparator 31, and a trigger circuit 32.

The power stage 1 has an input 10 adapted to be connected to a power source (V1), and an output for outputting an output signal (VO) to a load (not shown) The power stage 1 includes a voltage-controlled switching device 11 connected between the input 10 and the output 14. The voltage-controlled switching device 11 has a control input 111 for receiving a control signal (P). The voltage-controlled switching device 11 is operable-at a switch-ON mode, where the control signal (P) is a high-level signal, and a switch-OFF mode, where the control signal (P) is a low-level signal. The power stage 1 further includes a filter circuit 13 connected between the voltage-controlled switching device 11 and the output 14. The filter circuit 13 includes an inductor (L1) and a capacitor (C1).

The comparator 31 has a first input end 311 for receiving a trigger signal (m), a second input end 312 connected to the output 14 of the power stage 1 via a resistor (R2) of a voltage-dividing circuit for receiving an input signal associated with the output signal (VO), and an output end 313 connected to the control input 111 of the voltage-controlled switching device 11. The comparator 31 compares the trigger signal (m) received at the first input end 311 and the input signal received at the second input end 312, and outputs the control signal (P) at the output end 313 in accordance with result of the comparison, wherein the control signal (P) is the high-level signal when the trigger signal (m) is greater than the input signal, and wherein the control signal (P) is the low-level signal when the trigger signal (m) is less than the input signal. In this embodiment, the comparator 31 is an operational amplifier. The first input end 311 is a non-inverting input, whereas the second input end 312 is an inverting input.

The trigger circuit 32 has an input port 321 adapted to be connected to a reference voltage source (Vref) for receiving a reference voltage, a second input port 322 connected to the output end 313 of the comparator 31 for receiving the control signal (P), and an output port 323 connected to the first input end 311 of the comparator 31 so as to supply the trigger signal (m) to the comparator 31. The trigger circuit 32 is operable such that the control signal (P) becomes the high-level signal when the trigger signal (m) reaches a first threshold voltage (Vt1), and such that the control signal (P) becomes the low-level signal when the trigger signal when the trigger signal (m) reaches a second threshold voltage (Vt2) greater than the first threshold voltage (Vt1). In this embodiment, the trigger circuit 32 includes a first resistor (R6) connected between the first input port 321 and the output port 323, and a capacitor (C2) and a second resistor (R8) connected in series between the output port 323 and the second input port 322.

Figure 2:
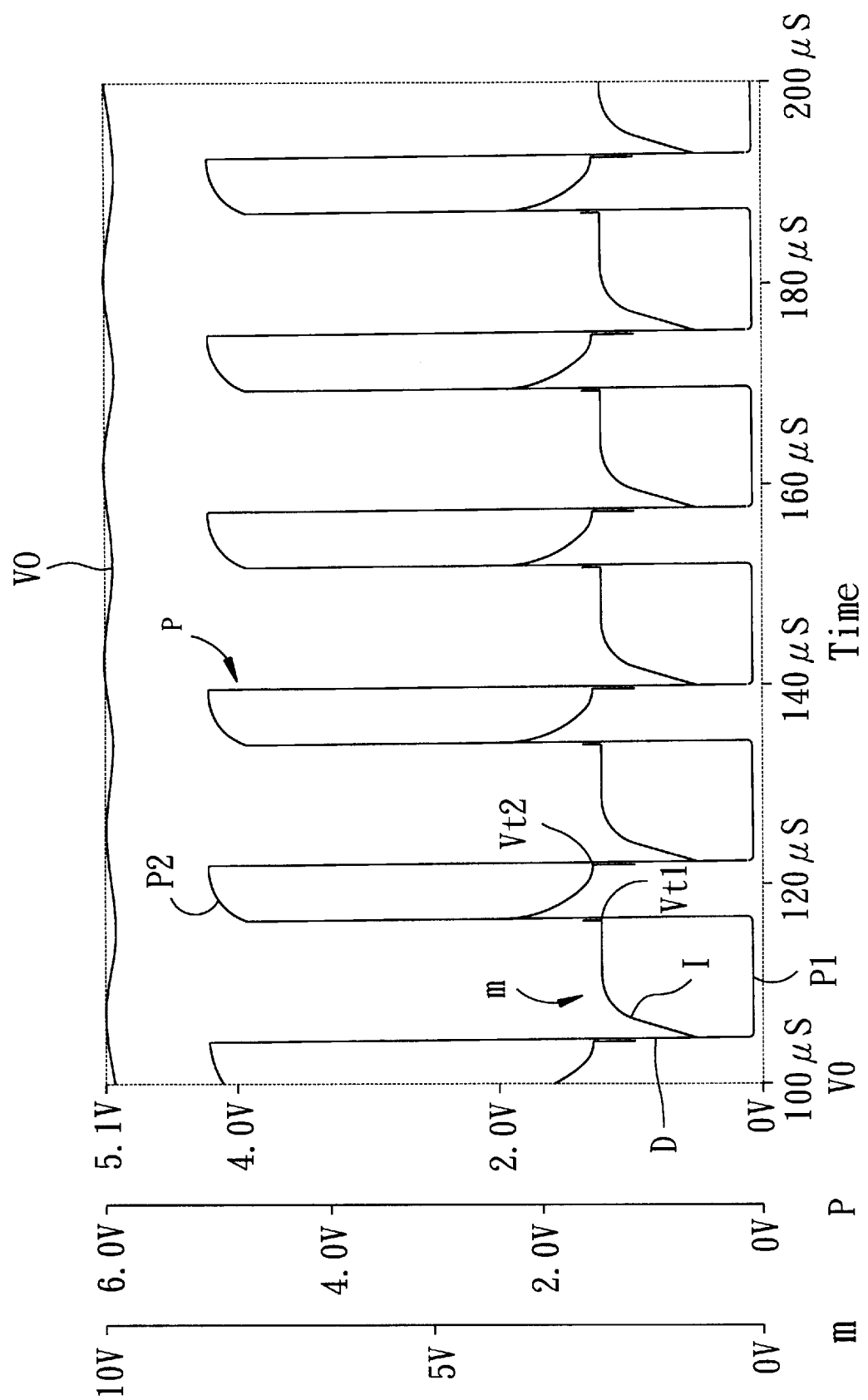
FIG. 2 is a timing diagram illustrating an output signal (VO), a trigger signal (m), and a control signal (P).

With further reference to FIG. 2, when the input signal received at the second input end 312 of the comparator 31 is greater than the trigger signal (m) received at the first input end 311 of the comparator 31, the voltage-controlled switching device 11 is operated at the switch-OFF mode. The capacitor (C2) of the trigger circuit 32 is charged by the reference voltage source (Vref) such that the trigger signal (m) can exceed the first threshold voltage (Vt1). The control signal (P) is steadily maintained at the low-level signal (P1) that is regarded to as a first stable state as long as the trigger signal (m) has yet to reach the first threshold voltage (Vt1). When the input signal received at the second input end 312 of the comparator 31 eventually becomes less than the trigger signal (m) received at the first input end 311 of the comparator 31, the voltage-controlled switching device 11 is operated at the switch-ON mode. The control signal (P) transits at once to the high-level signal (P2) that is regarded to as a second stable state, and the capacitor (C2) discharges via the first resistor (R6) such that the trigger signal (m) can drop below the second threshold voltage (Vt2). The control signal (P) is steadily maintained at the high-level signal (P2) until the trigger signal (m) reaches the second threshold voltage (Vt2). Therefore, a bistable periodic pulse signal, which serves as the control signal (P), is accordingly obtained.

It is worthwhile to note that, during each cycle of the trigger signal (m) a masking effect and an inverted masking effect occur. Each of the masking and inverted masking effects is attributed to a differentiating action (D) and an integrating action (I) associated with the resistors (R6, R8) and the capacitor (C2) to prevent the occurrence of glitch switching.

It is apparent from the foregoing that the voltage converter 4 of the present invention utilizes a simple circuit design, which includes the comparator 31 and the trigger circuit 32 with the voltage-divider arrangement, connected electrically to the power stage 1 so as to form a closed loop. By virtue of the voltage difference between the first and second input ends 311, 312 of the comparator 31, a step signal maybe outputted. An AC hysteresis occurs when the step signal passes through a positive feedback path consisting of the feedback resistor (R8) and the feedback capacitor (C2) so as to generate the trigger signal (m) with masking effect at the first input end 311 of the comparator 31 such that the control signal (P) outputted at the output end 313 of the comparator 31 can control the voltage-controlled switching device 11 to perform synchronous switching operation with accuracy.

It has thus been shown that the trigger circuit 32 enables the comparator 31 to output the periodic pulse signal serving as the control signal (P) to enable the voltage-controlled switching device 11 to be activated periodically such that the voltage converter 4 generates the output signal (VO) with a stable output voltage. Moreover, the trigger circuit 32 of the present invention has a relatively simple construction so as to result in a relatively low production cost.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A voltage converter comprising:
   a power stage having an input adapted to be connected to a power source, and an output for outputting an output signal to a load, said power stage including a voltage-controlled switching device connected between said input and said output, said voltage-controlled switching device having a control input for receiving a control signal, said voltage-controlled switching device being operable at a switch-ON mode, where the control signal is a high-level signal, and a switch-OFF mode, where the control signal is a low-level signal;
   a comparator having a first input end for receiving a trigger signal, a second input end for receiving an input signal associated with the output signal, and an output end connected to said control input of said voltage-controlled switching device, said comparator comparing the trigger signal received at said first input end and the input signal received at said second input end, and outputting the control signal at said output end in accordance with result of comparison, wherein the control signal is the high-level signal when the trigger signal is greater than the input signal, and wherein the control signal is the low-level signal when the trigger signal is less than the input signal; and a trigger circuit having a first input port adapted to be connected to a reference voltage source for receiving a reference voltage, a second input port connected to said output end of said comparator for receiving the control signal, and an output port connected to said first input end of said comparator so as to supply the trigger signal to said comparator, said trigger circuit being operable such that the control signal becomes the high-level signal when the trigger signal reaches a first threshold voltage, and such that the control signal becomes the low-level signal when the trigger signal reaches a second threshold voltage greater than the first threshold voltage, said trigger circuit enabling said comparator to output a periodic pulse signal that serves as the control signal to enable said voltage-controlled switching device to be activated periodically such that said voltage converter generates the output signal with a stable output voltage.

2. The voltage converter as claimed in claim 1, wherein said power stage further includes a filter circuit connected between said voltage-controlled switching device and said output.

3. The voltage converter as claimed in claim 1, wherein said voltage converter is a direct current-to-direct current voltage converter.

4. The voltage converter as claimed in claim 1, wherein said comparator is an operational amplifier, said first input end being a non-inverting input, said second input end being an inverting input.

5. The voltage converter as claimed in claim 1, wherein said trigger circuit includes a first resistor connected between said first input port and said output port, and a capacitor and a second resistor connected in series between said output port and said second input port, said capacitor being adapted to be charged by the reference voltage source such that the trigger signal can exceed the first and second threshold voltages when said voltage-controlled switching device is operated at the switch-OFF mode, said capacitor discharging via said first resistor such that the trigger signal can drop below the first and second threshold voltages when said voltage-controlled switching device is operated at the switch-ON mode.

6. The voltage converter as claimed in claim 1, further comprising a voltage-dividing circuit that interconnects said second input end of said comparator and said output of said power stage.

7. A control device for generating a control signal in a voltage converter, the voltage converter including a power stage that has an input connected to a power source, and an output for outputting an output signal to a load, the power stage including a voltage-controlled switching device connected between the input and the output, the voltage-controlled switching device having a control input for receiving the control signal, the voltage-controlled switching device being operable at a switch-ON mode, where the control signal is a high-level signal, and a switch-OFF mode, where the control signal is a low-level signal, said control device comprising:

a comparator having a first input end for receiving a trigger signal, a second input end for receiving an input signal associated with the output signal, and an output end adapted to be connected to the control input of the voltage-controlled switching device, said comparator comparing the trigger signal received at said first input end and the input signal received at said second input end, and outputting the control signal at said output end in accordance with result of comparison, wherein the control signal is the high-level signal when the trigger signal is greater than the input signal, and wherein the control signal is the low-level signal when the trigger signal is less than the input signal; and a trigger circuit having a first input port adapted to be connected to a reference voltage source for receiving a reference voltage, a second input port connected to said output end of said comparator for receiving the control signal, and an output port connected to said first input end of said comparator so as to supply the trigger signal to said comparator, said trigger circuit being operable such that the control signal becomes the high-level signal when the trigger signal reaches a first threshold voltage, and such that the control signal becomes the low-level signal when the trigger signal reaches a second threshold voltage greater than the first threshold voltage, said trigger circuit enabling said comparator to output a periodic pulse signal that serves as the control signal to enable the voltage-controlled switching device to be activated periodically such that the voltage converter generates the output signal with a stable output voltage.

* * * * *